United States Patent [19]

Rogers et al.

[11] Patent Number: 5,332,257
[45] Date of Patent: Jul. 26, 1994

[54] TETHER RETENTION SYSTEM FOR AIRBAG MODULE COVER

[75] Inventors: Mark Rogers, Roy; Larry D. Rose, Layton, both of Utah

[73] Assignee: Morton International, Inc., Chicago, Ill.

[21] Appl. No.: 103,972

[22] Filed: Aug. 9, 1993

[51] Int. Cl.⁵ .............................................. B60R 21/16
[52] U.S. Cl. ........................... 280/728 B; 280/728 A; 280/732
[58] Field of Search ........... 280/728 R, 728 A, 728 B, 280/730, 732; 403/381, 315, 294; 256/47

[56] References Cited

U.S. PATENT DOCUMENTS

| | | | |
|---|---|---|---|
| 3,944,250 | 3/1976 | Walf et al. | 280/732 |
| 4,342,524 | 8/1982 | Anderson | 403/381 |
| 4,925,209 | 5/1990 | Sakurai | 280/728 B |
| 5,072,967 | 12/1991 | Batchelder et al. | 280/732 |
| 5,118,132 | 6/1992 | Nakajima | 280/728 B |
| 5,184,843 | 3/1993 | Berger et al. | 280/728 A |

FOREIGN PATENT DOCUMENTS 0415362  3/1991  European Pat. Off. ........ 280/728 B

Primary Examiner—Margaret A. Focarino
Assistant Examiner—Christopher P. Ellis
Attorney, Agent, or Firm—George W. Rauchfuss; Gerald K. White

[57] ABSTRACT

A tether retention system for an airbag module cover includes a channel formed in the side of the reaction canister. One end of the tether includes a loop which is inserted into the channel through a slot. A solid rod is inserted into the channel and through the loop to anchor it in place.

6 Claims, 2 Drawing Sheets

TETHER RETENTION SYSTEM FOR AIRBAG MODULE COVER

TECHNICAL FIELD

This invention relates to the field of motor vehicle airbag systems. More specifically, it relates to means for tethering the cover of a passenger side airbag module.

BACKGROUND ART

Passenger side airbag modules are normally positioned behind the instrument panel of a motor vehicle. The module comprises a reaction canister which houses a cylindrical inflator and a folded airbag. A breakaway portion of the instrument panel forms the cover of the airbag module. Upon inflation, the airbag rapidly expands, breaking away the module cover portion of the instrument panel to provide a protective cushion for the passenger.

It is customary to provide some type of tether on the module cover to prevent it from flying into the vehicle. Because of flexibility and availability of material, it would be desirable to employ fabric tethers for these applications. However, this has created problems in the past due to the fact that the end of the tether secured to the reaction canister has a finite number of attachment points. The attachment points might be, for example, rivets. Point loading at the attachment points tends to cause the fabric tether to fail. The problem has been to provide a tether with adequate strength to withstand the force of propelling the cover.

Accordingly, it is a primary object of the present invention to provide a fabric tether restraint wherein the force of deployment is evenly spread along the tether width. Other objects, features, and advantages will become apparent from the following description and appended claims.

DISCLOSURE OF INVENTION

In accordance with the present invention, one end of a wide fabric tether is securely fastened to the airbag module cover. The other end of the tether is formed into a loop. A retention rod is passed through the loop and is secured to the reaction canister.

BEST MODE FOR CARRYING OUT THE INVENTION

Figure 1:
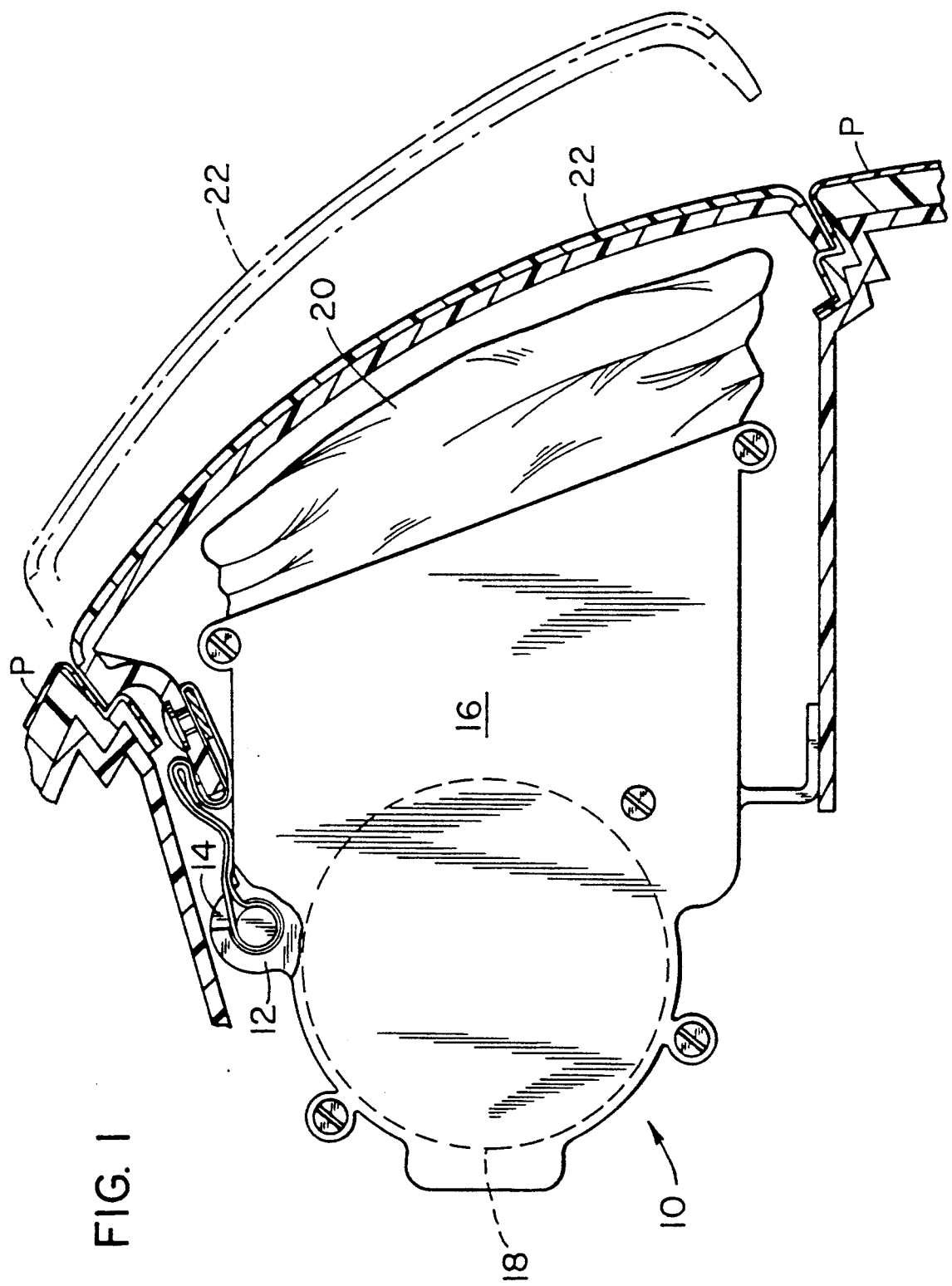
FIG. 1 is an end view of an airbag module incorporating this invention with a portion of the reaction canister end plate broken away to illustrate the internal construction.

With particular reference to FIG. 1, there is illustrated a passenger side airbag module 10 which is positioned behind the instrument panel P of a vehicle. It comprises a trough-shaped extruded aluminum reaction canister 12. The ends of the reaction canister 12 are closed by end plates 14, 16. A cylindrical portion of the reaction canister houses an inflator 18 which is connected to the mouth of a collapsed and folded airbag 20.

The airbag module 10 is closed by a cover 22 which forms a breakaway portion of the instrument panel P. The cover 22 may be incorporated into the instrument panel P by any of the methods known to the prior art. Upon actuation of the inflator 18, the airbag 20 will inflate, causing the cover 22 to break away from the instrument panel as shown by the dash dotted lines. However, the cover 22 is retained within the immediate proximity of the instrument panel P by means of the tether system of this invention, which is shown most clearly in FIG. 2.

Figure 2:
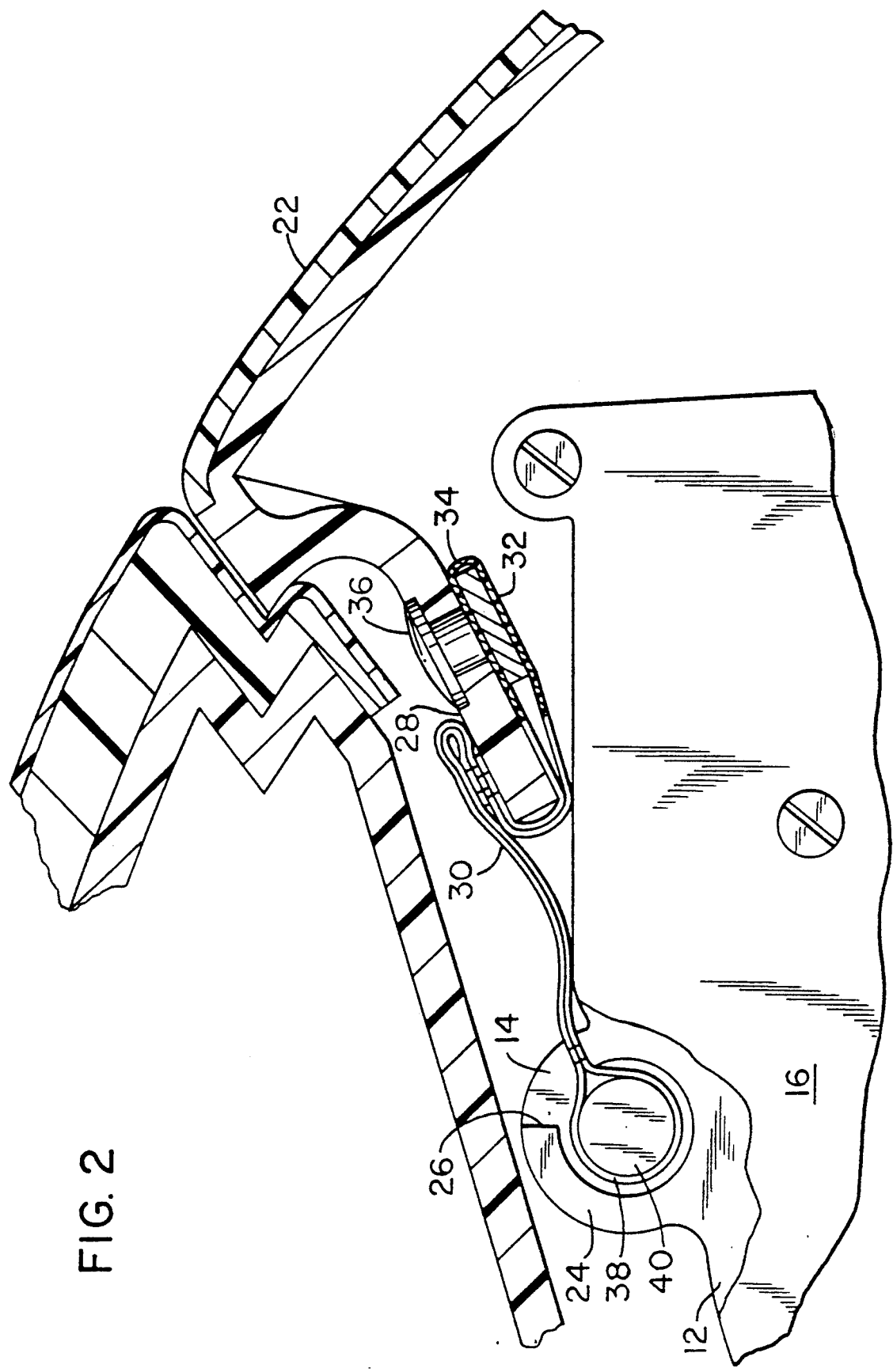
FIG. 2 is an enlarged detail illustrating the tether attachment.

As will be seen in FIG. 2, the extruded aluminum canister 12 is formed with a cylindrical channel 24 which extends along its length. It includes a slot opening 26. The cover 22 has a depending flange 28 along one edge. A fabric tether 30 has a width substantially equal to the length of the canister 12. It is formed with a loop at each end. For example, it may be a single piece of fabric folded upon itself and sewn or fused to form a double ply main body with single ply loops. One loop 32 is connected to the cover flange 28 by means of a metal bar 34. The bar 34 passes through the loop 32 and is secured to flange 28 by means of spaced rivets 36. (It will be understood that other means for securing the tether end to the cover 22 may be employed. For example, the tether could be molded directly into the body of the cover 22.) The remaining loop 38 is inserted into the slot 26 of the channel 24 and a metal retainer rod 40 is inserted into the channel and through the loop 38. The retainer rod 40 is selected to have a diameter greater than the slot opening 26. It is retained within the channel 24 by the end plates 14, 16 on the ends of the canister 12.

A satisfactory tether may be formed of nylon fabric, although the invention is not so limited. It is important to note that, upon deployment of the cover 22, the force applied through the tether 30 to the retainer rod 40 will be spread along the entire width of the tether to achieve the effect of an infinite number of attachment points. Accordingly, any inclination of the tether to rupture is substantially diminished.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In an airbag module for use in a motor vehicle including a reaction canister housing an airbag and an airbag inflator and a module cover displaceable by said airbag upon inflation, the improvement which comprises:

a tether having first and second ends, the first end being secured to said module cover and the second end forming a loop;

a retainer rod extending through said loop; and a channel enclosing said retainer rod and loop in a fixed position in said motor vehicle to anchor said tether during displacement of said module cover.

2. In an airbag module for use in a motor vehicle including a reaction canister housing an airbag and an airbag inflator and a module cover displaceable by said airbag upon inflation, the improvement which comprises:

a tether having first and second ends, the first end being secured to said module cover and the second end forming a loop;

a retainer rod extending through said loop; and positioning means in the form of a channel on said reaction canister enclosing said retainer rod and loop therein to anchor said tether during displacement of said module cover.

3. The improvement of claim 2 wherein said positioning means additionally comprises at least one end plate on said reaction canister blocking an end of said channel.

4. The improvement of claim 3 wherein said tether is fabric.

5. The improvement of claim 4 wherein said tether is a single ply fabric folded upon itself to form a double ply main body with a loop at each end.

6. The improvement of claim 1 wherein said tether is a single ply material folded upon itself to form a double ply main body with a loop at each end.

* * * * *